No. 793,840. PATENTED JULY 4, 1905.
O. LAUBER.
RECOIL GUN.
APPLICATION FILED MAR. 13, 1905.
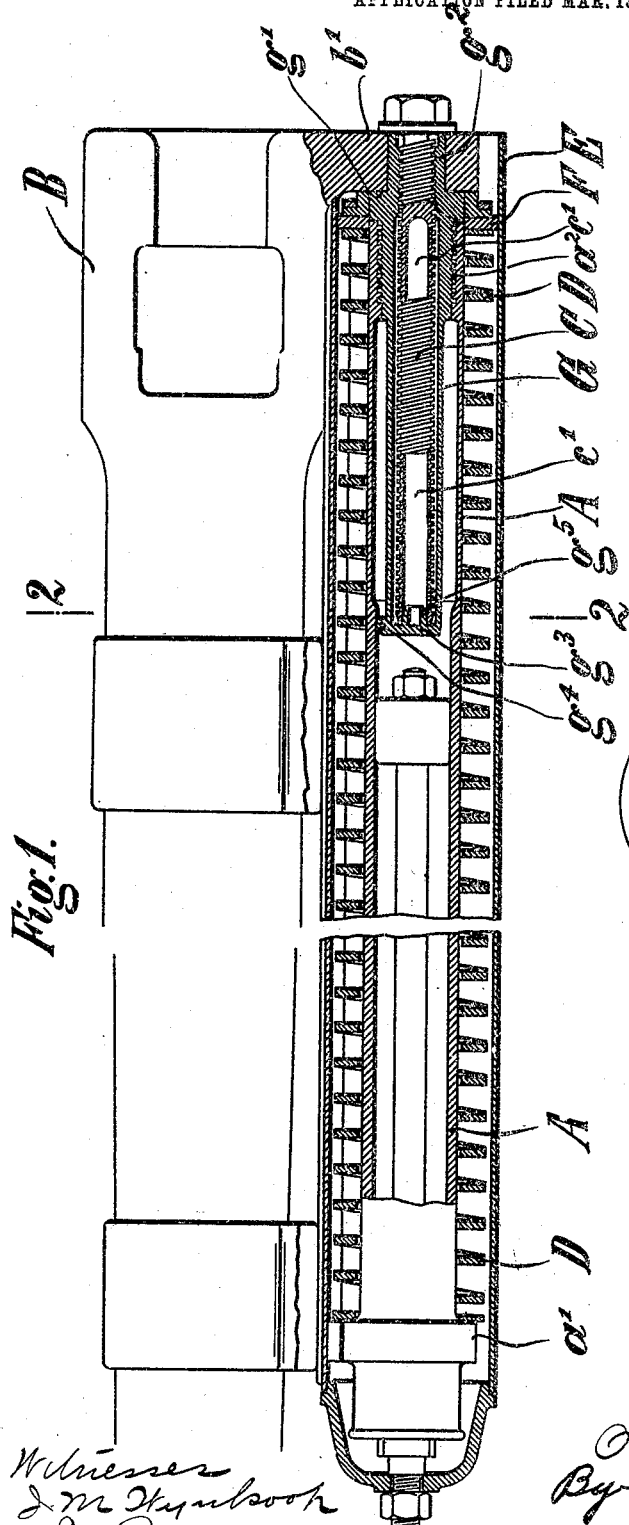
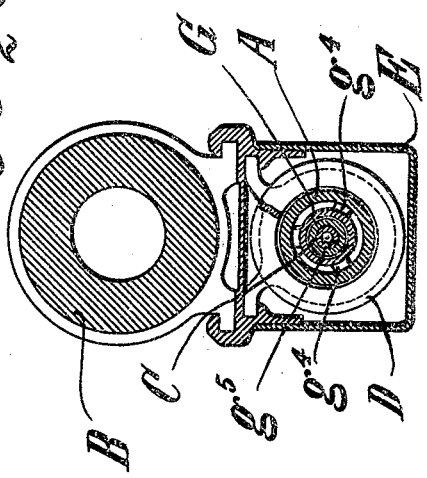

No. 793,840. Patented July 4, 1905.

UNITED STATES PATENT OFFICE.

OTTO LAUBER, OF ESSEN-ON-THE-RUHR, GERMANY, ASSIGNOR TO FRIED. KRUPP AKTIENGESELLSCHAFT, OF ESSEN-ON-THE-RUHR, GERMANY.

RECOIL-GUN.

SPECIFICATION forming part of Letters Patent No. 793,840, dated July 4, 1905.

Application filed March 13, 1905. Serial No. 249,846.

*To all whom it may concern:*

Be it known that I, OTTO LAUBER, a subject of the German Emperor, and a resident of Essen-on-the-Ruhr, (West,) Germany, have invented certain new and useful Improvements in Recoil-Guns, of which the following is a specification.

The present invention relates to recoil-guns; and the object of the invention is to improve the means for securing the brake-cylinder to the gun-barrel and for incasing the recuperator-spring forming part of the subject-matter of my United States patent application filed September 13, 1901, Serial No. 75,295.

In the accompanying drawings, in which I have by the way of example shown the invention applied to guns with long recoil, Figure 1 is a side view, partly in section, of the parts of the gun having relation to my invention; and Fig. 2 is a section on line 2 2 of Fig. 1 and seen from the right.

As in the previous United States patent application referred to, the brake-cylinder is connected with the horn $b'$ of the gun-barrel B by means of a screw-spindle C of such a length that it may simultaneously be used as a tension-screw for the recuperator-spring D. At front the recuperator-spring D rests against a collar $a'$ on the brake-cylinder, which partakes of the gun-barrel's recoil movement, and at rear it rests against an abutment F, rigidly connected to the stationary cradle E.

The screw-spindle C engages the internally-threaded rear portion of a cylindrical sleeve G, that is arranged coaxially with the brake-cylinder A and firmly screwed into the same at $a^2$. The rear end of the sleeve is provided with a shoulder $g'$ and a projection $g^2$, the latter projecting into a bore in the horn $b'$. At front the sleeve is closed by a head $g^3$, and for the greater part of its length the sleeve is of a width that is less than the diameter of the bore of the brake-cylinder. In order to make the spindle C as light as possible, the part of the spindle that does not engage the threads of the sleeve is provided with a central bore $c'$. For the purpose of supporting the free end of the sleeve G and the screw-spindle C within the brake-cylinder the sleeve is provided with three exterior radially-projecting studs $g^4$, and the inner face of the sleeve-head $g^3$ is provided with a tap $g^5$, that is coaxial with the threads of the sleeve G and abuts against the wall of the bore $c'$ of the screw C.

The incasing of the recuperator-spring D and the securing of the brake-cylinder to the gun-barrel are accomplished as follows: After the recuperator-spring has been shoved onto the brake-cylinder the latter is inserted in the cradle E from the front and the spring compressed until the screw C, with its head against the horn $b'$, engages the internal threads of the sleeve G. Then the screw is turned in and the projection $g^2$ of the sleeve G passes into the bore of the horn $b'$, while the tap $g^5$ of the sleeve enters the bore $c'$ in the screw C, and the screwing is continued until the shoulder $g'$ of the sleeve G abuts against the horn $b'$.

The advantage of the present invention over the construction shown in the previous United States patent referred to will be readily understood from the following comparison: In the prior application the screw-spindle for securing the brake-cylinder on the gun-barrel and for imparting tension to the recuperator-spring projects into a hollow space in the brake-cylinder and a partition-wall separates the hollow space from the space for the brake fluid. The partition-wall is employed for the purpose of obviating a stuffing-box for the screw-spindle. The arrangment of the partition-wall, however, results in a considerable reduction in the capacity of the brake-cylinder for the brake fluid. In the present invention the arrangement of the sleeve G does away with this drawback and at the same time does not necessitate the use of a stuffing-box for the screw C. Moreover, the studs $g^4$ and the tap $g^5$, which support the free end of the screw C in the surrounding hollow space, prevent the screw from vibrating during travel or during firing. Such vibration is likely to cause change in the textures of the material of the screw, with consequent impairment of its security. The last-named advantage might be obtained in the construction shown in the prior application referred to by providing, for instance, on the partition-wall a boss for supporting the free end of the screw, as does the tap $g^5$ of the sleeve G in the present invention.

Having thus described the invention, the following is what is claimed as new:

1. In a recoil-gun of the character described, the means for securing the brake-cylinder to the gun, projecting into the brake-cylinder, and having a housing spaced from the walls of the brake-cylinder.

2. In a recoil-gun of the character described, the means for securing the brake-cylinder to the gun, projecting into the brake-cylinder, and having a housing spaced from the walls of the brake-cylinder, and provided with means for supporting its free end within the brake-cylinder.

3. In a recoil-gun of the character described, the screw for securing the brake-cylinder to the gun, and putting the recuperator under tension, projecting into the brake-cylinder, and having a housing spaced from the walls of the brake-cylinder; means for centering the free end of said housing within the brake-cylinder while permitting the brake fluid to pass around the housing and means for centering the projecting end of the screw within the housing.

The foregoing specification signed at Essen, (Ruhr,) Germany, this 18th day of February, 1905.

OTTO LAUBER.

In presence of—
HARRY S. MEFFORD,
Frau PFUDEL.